United States Patent [19]
Wada et al.

[11] 4,330,860
[45] May 18, 1982

[54] ERROR CORRECTING DEVICE

[75] Inventors: Ryoichi Wada, Habikino; Mitsuharu Tsuchiya; Seno Takanori, both of Katano, all of Japan

[73] Assignee: Matsushita Electric Industrial Co., Ltd., Kadoma, Japan

[21] Appl. No.: 136,456

[22] Filed: Mar. 31, 1980

[30] Foreign Application Priority Data

Mar. 30, 1979 [JP] Japan ................................ 54-38751

[51] Int. Cl.³ ............................................ G06F 11/10
[52] U.S. Cl. ........................................ 371/37; 371/39
[58] Field of Search ....................... 371/37, 38, 39, 40, 371/43, 49

[56] References Cited

U.S. PATENT DOCUMENTS 3,623,155 11/1971 Hsiao et al. ..................... 371/37 X
3,958,220 5/1976 Marshall ............................. 371/39
4,107,652 8/1978 Tanahashi et al. ................... 371/37

Primary Examiner—Jerry Smith
Attorney, Agent, or Firm—Wenderoth, Lind & Ponack

[57] ABSTRACT

An error correcting device which is useful for digital data transmission, e.g.—in PCM (pulse coded modulation) type tape recorders. The positions of erroneous data are ascertained by an error detecting method such as the CRCC (cyclic redundancy check code) method. The error correction is performed using two kinds of check codes, P and Q. Check code P is obtained by a modulo 2 operation on each bit of a plurality of data. Check code Q is obtained by a modulo 2 operation on each bit of data which is successively shifted by adding extra bits having a predetermined polarity to the individual data units.

By means of above-rated error detection method and the two check codes, the present invention provides an error correcting device which is capable of correcting up to two erroneous data units. The error correcting circuit is constructed simply, and error correcting performance is increased.

5 Claims, 19 Drawing Figures

ERROR CORRECTING DEVICE

BACKGROUND OF THE INVENTION

The present invention relates to an error correcting device which is suited for use in transmitting digital data, or which is suited for use in a PCM (pulse code modulated) type tape recorder or the like which performs the recording and reproduction in the form of a time transmission.

The digital signals being transmitted are subject to received errors occurring during the path of transmission. Therefore, the receiving side must detect and correct erroneous data that are received.

SUMMARY OF THE INVENTION

The present invention is related to an error correcting device which is capable of correcting up to two erroneous data units by using a first check code formed by a modulo 2 operation on each bit of a plurality of data and a second check code obtained by a modulo 2 operation on each bit of the results that are successively shifted by adding extra codes having a predetermined polarity to the individual data units, and by the help of a pointer signal which indicates which data unit is erroneous. Namely, the present invention provides an error correcting device which has a simply constructed circuit setup and which exhibits increased error correcting performance.

BRIEF DESCRIPTION OF THE DRAWINGS

The invention is illustrated below with reference to the drawings, wherein.

DESCRIPTION OF PREFERRED EMBODIMENTS

Figures 1A, 1B, 2:
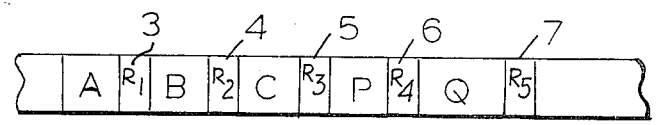
FIGS. 1a–1b illustrate setups of signals that are to be decoded by the present invention.
FIG. 2 is a diagram illustrating a setup of a signal that is to be transmitted.

FIG. 1 illustrates the first and second check codes used for the present invention, in which symbols A, B and C denote data that are to be transmitted and that consist of 10 bits each. Symbols P and Q denote the first and second check codes consisting of 10 bits and 12 bits, respectively.

The P code which is the first check code (hereinafter simply referred to as P code) consists of modulo 2 operation results of each bit of the data A, B and C, and can be given by the following relation, $$A_i \oplus B_i \oplus C_i = P_i \qquad (1)$$

wherein $i = 1$ to 10.

When any one of the data A, B and C is erroneous, the erroneous data can be restored using the remaining data and the P code. For instance, when the data A is erroneous, the data A can be calculated from the remaining data B, C and P code according to the following relation, $$A_i = B_i \oplus C_i \oplus P_i \qquad (2)$$

wherein $i = 1$ to 10.

The Q code which is the second check code (hereinafter simply referred to as Q code) consists of modulo 2 operation results of each bit of the data A, B and C that are successively shifted while inserting "0" into portions where no data is present, and can be given by the following relation (3), $$A_i \oplus B_{(i-1)} \oplus C_{(i-2)} = Q_i \qquad (3)$$

wherein
$i = 1$ to 12
$A_{11} = A_{12} = 0$
$B_{11} = B_0 = 0$
$C_{-1} = C_0 = 0$ It will be obvious that when any one of the data A, B and C is erroneous, the erroneous data can be restored relying upon the remaining data and the Q code.

FIG. 2 illustrates an arrangement when the data A, B, C and the codes P and Q are transmitted in a multiplex manner on a time axis. In FIG. 2, symbols $R_1$, $R_2$, $R_3$, $R_4$ and $R_5$ denote third check codes for generating pointer signals which indicate whether the data A, B, C and the codes P and Q received errors during the transmission. The third check codes will consist of CRCC (circulating codes) or the like.

The receiving side examines the third check codes and restores data, P or Q code when any one of them is erroneous. Noted below is an explanation of how the data and codes are restored when any two of them are erroneous.

First, when any one of the data A, B or C, and either one of the code P or code Q are erroneous, they can be treated as a single error using the remainder of the data and the code P or code Q, whichever is correct. Then, when two data are erroneous, i.e., when the data A and B are erroneous, they will not be restored by the code P alone. In this case, "0" of the extra two bits that are added when preparing the code Q, has not been transmitted and does not introduce error. Therefore, even when both data A and B are erroneous, $A_1$ can be regarded as a single error if attention is given to a bit $A_1$ only and can be restored. Namely, $$A_1 \oplus 0 \oplus 0 = Q_i \qquad (4)$$

so that the data are restored in a manner of $A_1 = Q_1$. Next, $P_1$ of the code P is given by $$A_1 \oplus B_1 \oplus C_1 = P_1 \qquad (5)$$

Here, $C_1$ and $P_1$ are not erroneous, and $A_1$ has been restored already. Hence, $B_1$ can be regarded as a single error and can be restored.

With regard to $A_2$, $$A_2 \oplus B_1 \oplus 0 = Q_2 \qquad (6)$$

from which $A_2$ can be regarded as a single error at the moment when $B_1$ is restored. As $A_2$ is restored, $$A_2 \oplus B_2 \oplus C_2 = P_2 \qquad (7)$$

whereby $B_2$ is allowed to be restored. Thus, all of the bits of the data A and B can be successively restored in accordance with the same procedure.

It will be obvious that the bits can be restored by the same procedure even when the data A and C or the data B and C are erroneous.

Thus, according to the setup of the signals employed by the present invention, simple parity codes of each of the bits of data and the parity code of the bits of successively shifted data which are added with extra bits having a predetermined polarity or pattern are transmitted, whereby a portion of the erroneous data is regarded as a single error and is restored utilizing the relationship of the parities which deviate from each other.

Figure 3A:
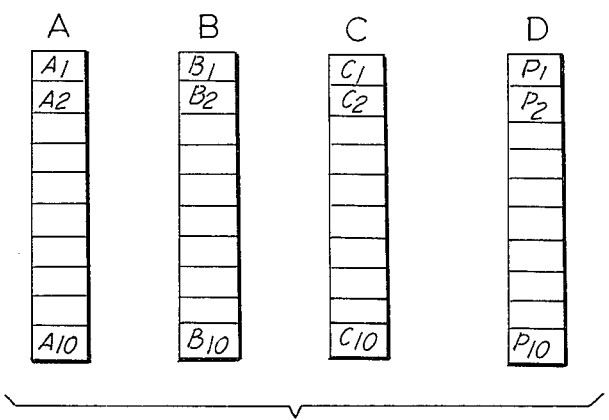
FIGS. 3a–3b illustrate other setups of signals that are to be decoded by the present invention.
Figure 3B:
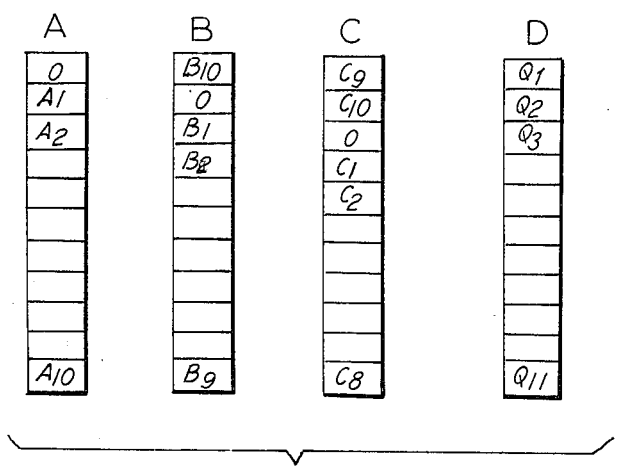

FIGS. 3a–3b illustrate other examples of signals formed by the present invention, in which data A, B and C each consist of 10 bits. To prepare the code Q, "0" of 1 bit is attached to an upper portion of each data. Then, the data B is downwardly shifted by 1 bit and the data C is downwardly shifted by 2 bits. Each bit of the data A, B and C is then subjected to a modulo 2 operation in the lateral direction. When the two data are erroneous in the case of this code, 1 bit is regarded as a single error and is restored. Further, since the data maintains a relationship of parities that deviate from each other, all the data can be restored by successively treating 1 bit by 1 bit. The advantage in this case is that the number of bits of the code Q is greater than the bit length of the data by 1 bit only. The defect, however, is that the order of corrected bits becomes complex. In the case of the signals shown in FIGS. 1a–1b, the data can be successively restored from the upper direction or the lower direction; the code Q, however, requires a bit length which is longer than the length of the data bits by two bits. When the data are to be successively corrected from the upper direction, however, the code Q does not require $Q_{12}$ which is the bit located at the bottom thereof. According to the abovementioned signals, a set of three data is used for preparing both the P and Q codes. In general, however, both the P and Q codes can be easily attached to a set of n data.

To correct the error as mentioned above, it is necessary to know which data or check code is erroneous. In addition to using the above-mentioned third check code, other method may be employed to generate the pointer signals.

For instance, when the present invention is used for a PCM tape recorder of the helically scanning rotary head type, the signals are recorded on the magnetic tape in the form of FM signals, whereby much of the error results from the drop-out caused by scars and the like on the tape. Therefore, erroneous data or check codes can be found by detecting the decrease of the envelope of the FM signals.

Another method consists of imparting the abovementioned function to the data signals themselves. For example, memories of computers employ a method by which 4 bits forming the data is changed into 5 bits such that, in magnetically recording the data in a direct manner, a period in which the magnetic flux does not change, will not occur. In this case, when a change in magnetic flux that should not develop is detected, the data should be recognized as to be erroneous; this makes it possible to generate pointer signals.

However, all of the above-mentioned methods utilize physical properties of a medium which transmit the codes. Therefore, the method which employs the third check codes has general applicability. Accordingly, mentioned below is the method which employs the third check codes.

With reference to FIG. 2, the addition of the third check codes $R_1$ to $R_5$ to the individual data and to the codes P and Q for the purpose of detecting errors, presents increased redundancy.

According to the present invention, however, the data is not restored unless the data and codes are individually examined as to whether they contain error and, hence, it is not possible to add third common check codes to the data and codes P and Q which pertain to the same set. The abovementioned problem can be solved if the third check codes are attached to the data or check codes of different sets.

Figure 4:
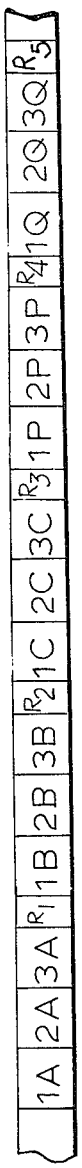
FIG. 4 illustrates another setup of a signal that is to be transmitted.

FIG. 4 illustrates the setup of a signal when the third check codes $R_1$ to $R_5$ are attached to the data to provide three different sets of codes. In FIG. 4, reference numbers 1A, 2A and 3A that are attached to the head portion denote sets of the data; 1A, 1B, 1C, 1P and 1Q constitute one set.

By attaching the third codes $R_1$ to $R_5$ to the data of different sets as mentioned above, the redundancy of codes can be reduced. The third check codes can be commonly attached provided the data pertains to different sets. Hence, the code $R_1$ may be attached to a set of 1A, 2B and 3C. That is, any combination is acceptable provided the data pertains to different sets. In other words, the combination should be so determined that it is suited for the hardware construction.

When the signal is to be used as a recording signal for the PCM-type tape recorder, the errors resulting from the tape take place in the form of bursts. Therefore, when the data to be recorded are placed close to each other, there is a probability that all the data may be lost at once. Hence, the data pertaining to the same set must be arranged so as to be separated from each other by a distance which is greater than the burst length.

The technique of such an interleave method has been widely known, and its details are not mentioned here. According to the signal setup employed by the present invention, however, errors of up to two words can be corrected, requiring the interleave distance to be one-half of a maximum burst length. Hence, the size of the memory necessary for the interleave processing may be small.

In general, if the error factor of data is denoted by K and errors take place in a random fashion, the probability of an error not being corrected becomes of the order of $K^2$ with a code which is capable of correcting only one erroneous code. Using the above-mentioned signal setup which is capable of correcting up to two errors, however, the probability of an error not being corrected becomes of the order of $K^3$. Here, if $K=10^{-4}$, the data which cannot be corrected develop in the order of $10^{-8}$ with the code which corrects only a single erroneous code. With the above-mentioned signal setup employed by the present invention, however, the data which cannot be corrected develop in the order of $10^{-12}$, making it possible to further reduce the probability of errors not being corrected.

Figure 5:
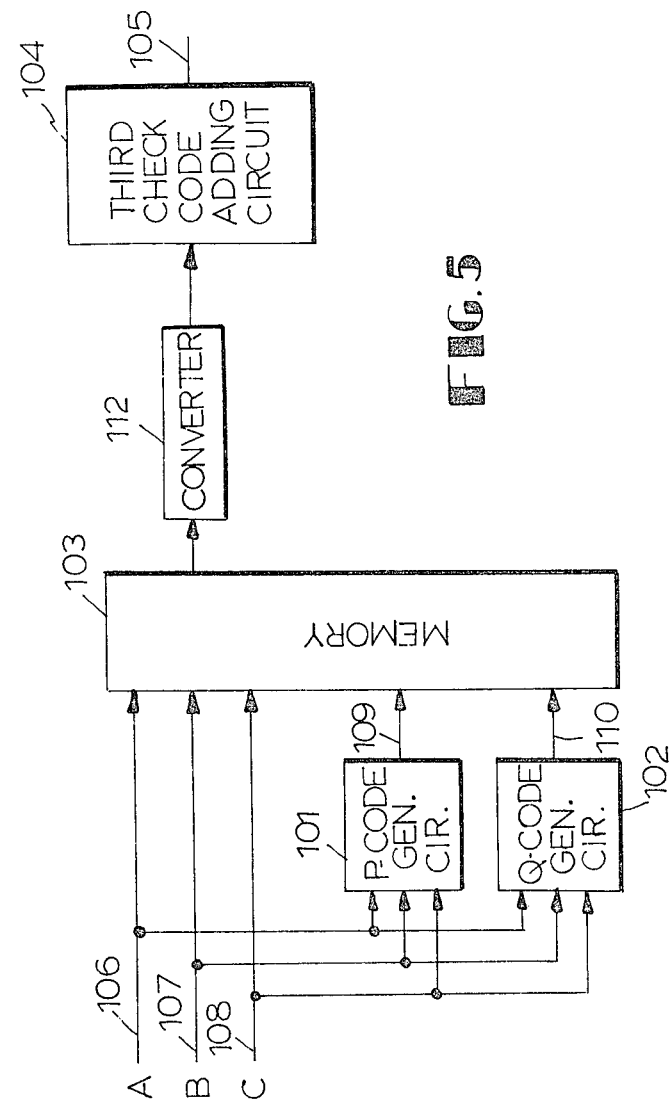
FIG. 5 is a block diagram illustrating important portions of a device for producing codes.

FIG. 5 is a block diagram illustrating an encoding circuit which is suited for generating the above-mentioned signals. In FIG. 5, the data A, B and C fed to input lines 106, 107 and 108 are introduced to a P-code generating circuit 101 and a Q-code generating circuit 102, whereby a P code and a Q code are prepared and are fed to output lines 109 and 110. Reference numeral 103 denotes a memory in which will be arranged the data A, B, C and codes P and Q at positions separated from each other on a time axis of output signals. A parallel/series converter circuit 112 successively converts the interleaved data and codes P and Q into signals of serial form, and sends them to a third check code addition circuit 104. The third check code addition circuit 104 adds third check codes to the individual data, the codes P and Q, and sends them to an output line 105. The circuits in the blocks of the setup of FIG. 5 are constituted by widely known standard logic circuits, and their details are not illustrated or diagramatized.

Figure 6:
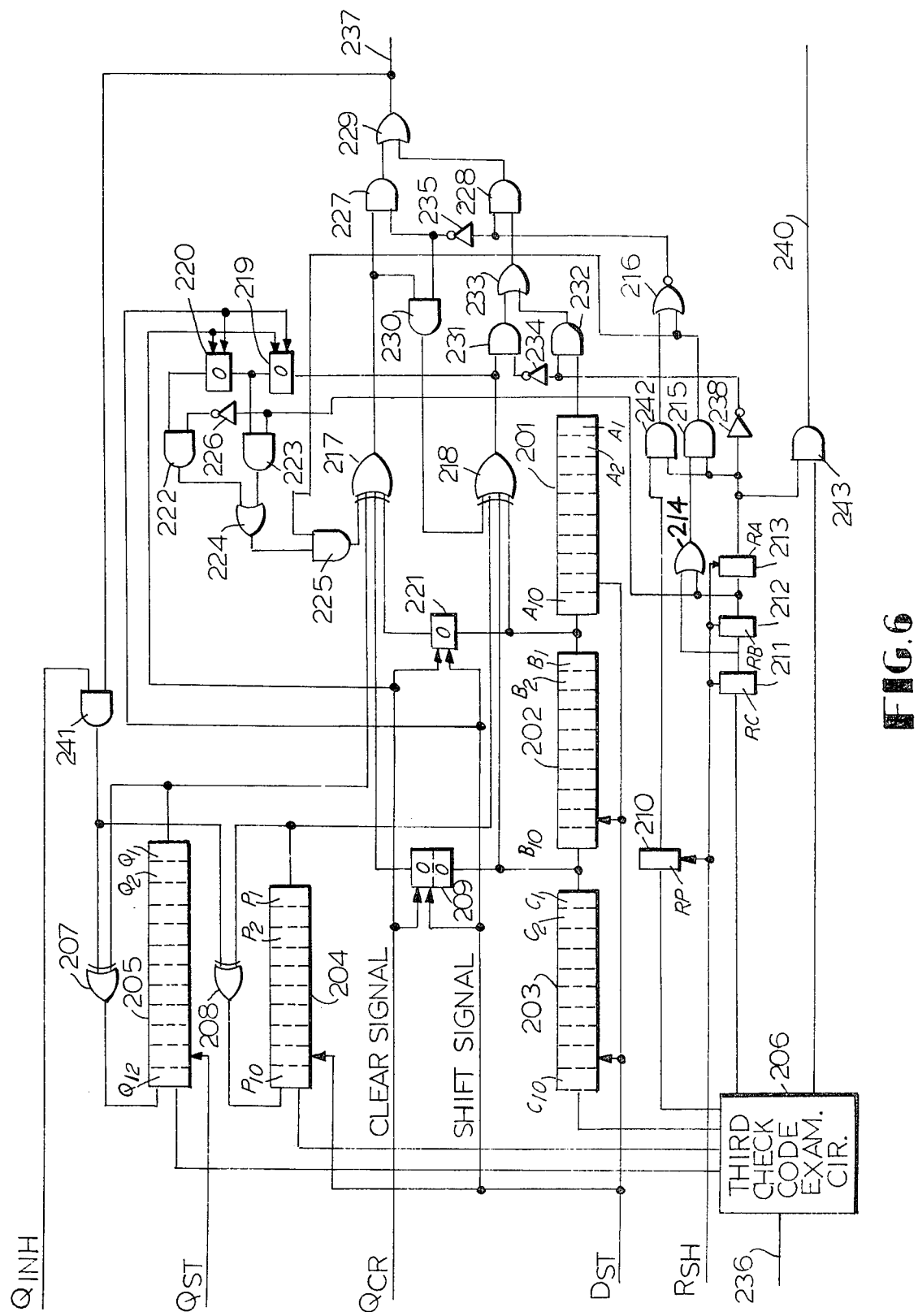
FIGS. 6, 7, 8, 9 and 10 are diagrams illustrating setups of decoder circuits.

FIG. 6 is a diagram illustrating the setup of a decoder circuit which is adapted for decoding the aforementioned signals. The decoder circuit diagramatized here decodes the signals shown in FIGS. 1 and 2.

In FIG. 6, a third check code examining circuit 206 examines the third check codes of the signals constructed as shown in FIG. 2 which are introduced into an input line 236, and the data A, B, C and codes P and Q are introduced into shift registers 201, 202, 203, 204 and 205 in the order mentioned.

In this case, the pointer signals which are the examined results of third check codes are set into flip-flop circuits 213, 212, 211 and 210. Here, when the results of the examination are detected to be erroneous, a "1" is set therein and, at the same time, the data A, B, C and codes P and Q which are to be examined are all fed to the corresponding shift registers with their levels being "0". Under the state illustrated in FIG. 6, the examined result of data A is set into flip-flop circuit 213, the examined results of data B is set into flip-flop circuit 212, the examined results of data C is set into flip-flop circuit 211, and the examined results of code P is set into flip-flop circuit 210, as denoted by RA, RB, RC and RP.

When none of the data A, B and C is erroneous, the individual data are fed to an output line 237 one bit by one bit responsive to shift clock pulses DST via AND gate circuit 232, OR gate circuit 233, AND gate circuit 228, and OR gate circuit 229. In this case, circuits other than the above of FIG. 6 exhibit no function.

Noted below is the case when only the data A is erroneous. The examined result RA is "1", and the examined results "RB" and "RC" are "0". Hence, an output of an exclusive OR gate circuit 218 is produced on the output line 237. In this case, the output of the exclusive OR gate circuit 218 is the results of a modulo 2 operation of the individual bits of data B, C and code P. Hence, a decoded data A is produced onto the output line 237. When the data are successively shifted, a "0" is inserted after $C_{10}$.

Figure 7:
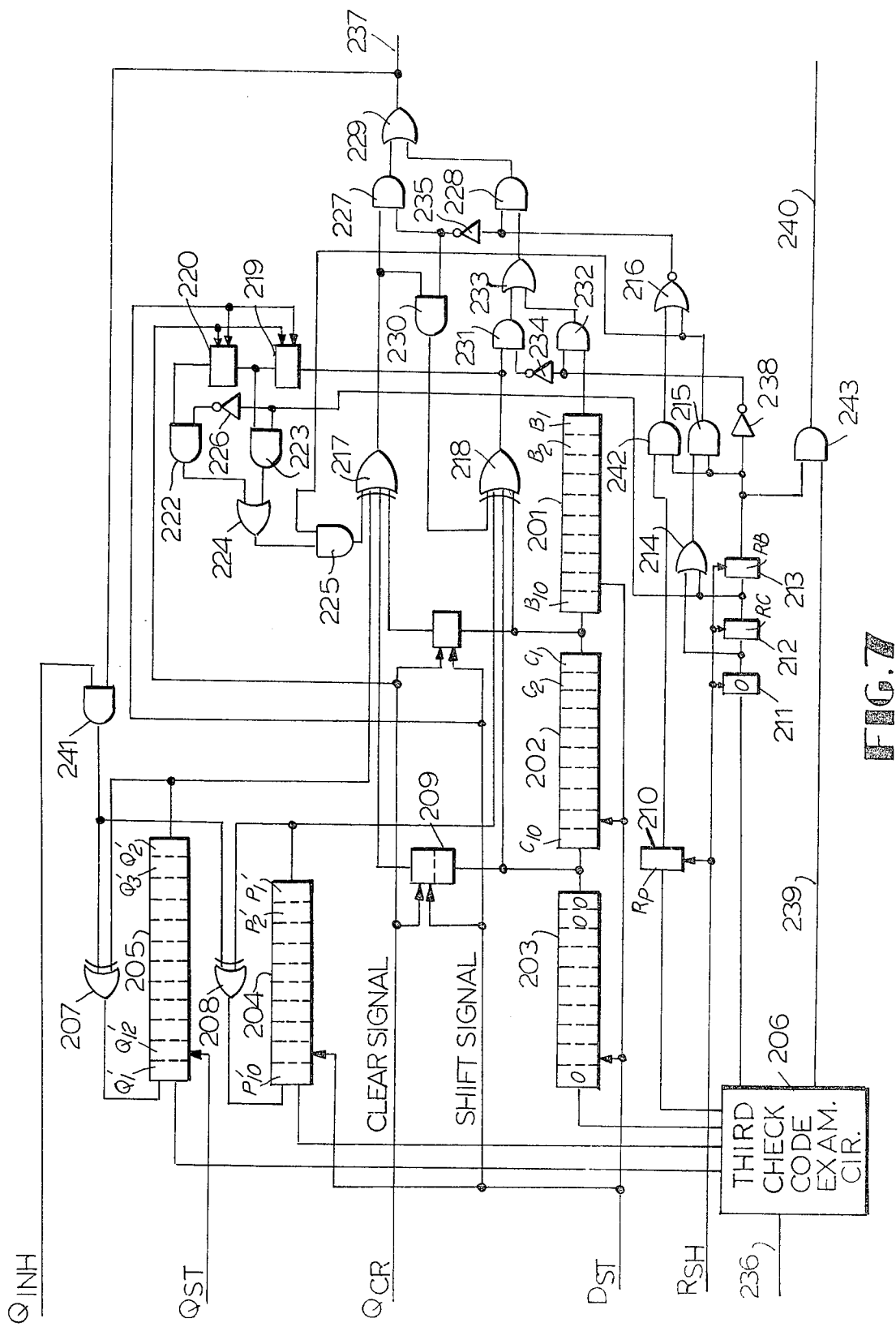

When the data B is erroneous, the feeding of the data A to the exclusive OR gate circuit 218 is not allowed since the data A has been transferred. Accordingly, the data transferred from the output line 237 are successively subjected to a modulo 2 operation by the exclusive OR circuit 208, and are newly set into shift register 204. FIG. 7 illustrates the contents of the registers after the data A has been transferred. With reference to a code P', since, $$P_i \oplus A_i = P_i' \tag{8}$$

where i=1 to 10, when the data B is erroneous, it can be reproduced into, $$B_i = P_i \oplus A_i \oplus C_i = P_i' \oplus C_i \tag{9}$$

where i=1 to 10. Namely, the exclusive OR gate circuit 218 simply performs the modulo 2 operation of the data C and code P' to restore a data B.

The restoration of data from the data which contains a single error, contains a part of double error correction. That is, when the code Q other than the data is erroneous, the correction is effected in accordance with the same procedure as above. When the code P and any one of the data A, B, C are erroneous, the erroneous data is restored from the code Q and the remaining correct data. In this case, since RP is "1", when, for example, the data A is erroneous in FIG. 6, the output of the exclusive OR gate circuit 217 is produced onto the output line 237. The exclusive OR gate circuit 217 receives the code Q, the data B which is delayed by 1 bit by shift register 221 and the data C which is delayed by 2 bits by shift register 209, to restore the data A.

A shift register 205 for the code Q consists of 12 bits, but is served with 13 shift pulses QST. Therefore, after the data A has been transferred, $Q_2'$ comes to the head as shown in FIG. 7. When the data B is erroneous, it can be instantly restored by the data C which is delayed by 1 bit and by the code Q' having $Q_2'$ at the head.

The same holds true even when the data C is erroneous.

Figure 8:
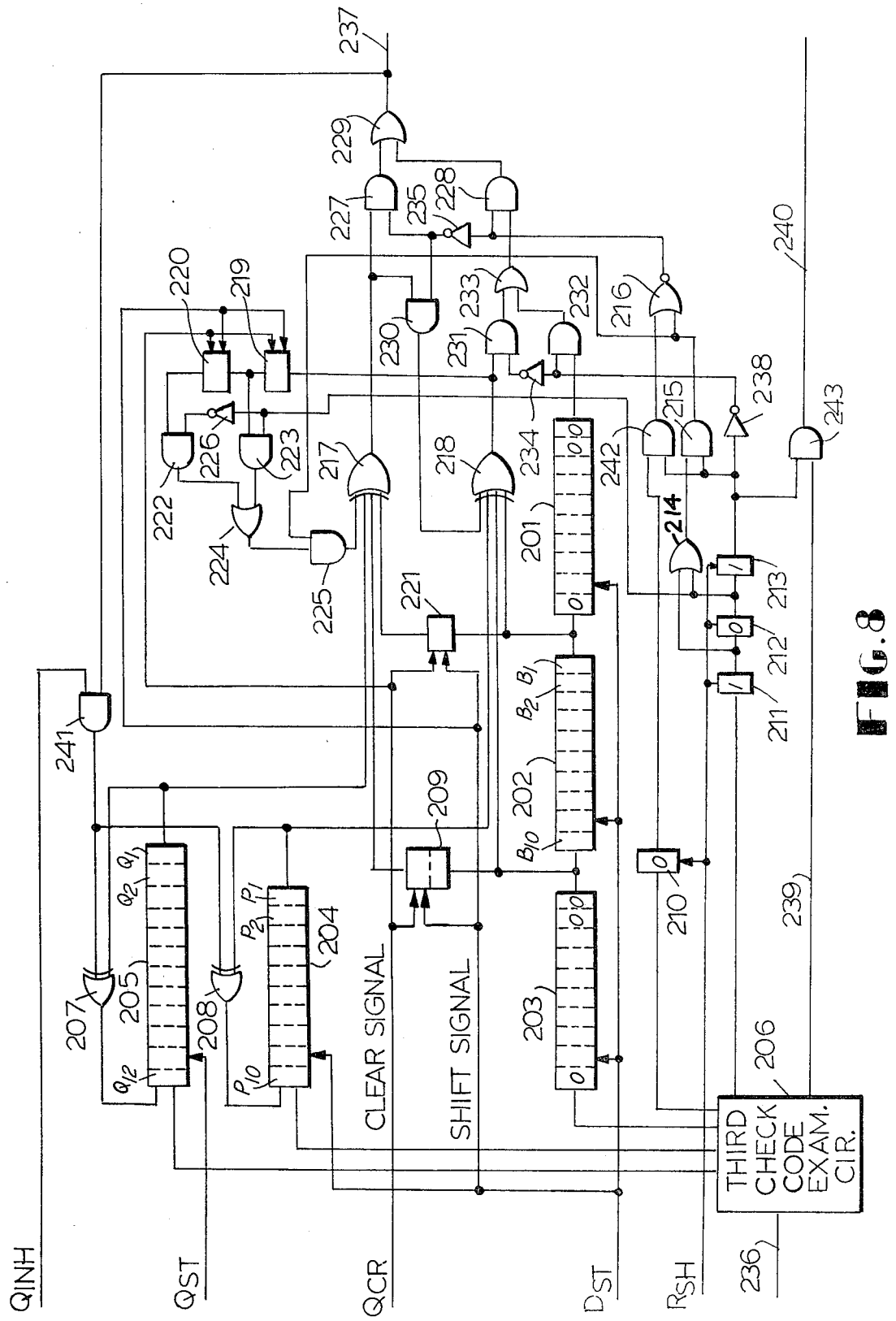

Noted below is the case when two of the data A, B and C are erroneous. For instance, when the data A and C are erroneous, the registers are first set as illustrated in FIG. 8. In this case, the output of a NOR gate circuit 216 becomes "0", and the output of the exclusive OR gate circuit 217 is produced on the output line 237.

Furthermore, the AND gate circuit 230 is opened, and the output of the exclusive OR gate circuit 217 is fed to an exclusive OR gate circuit 218. The output of the shift register 220 is fed to the exclusive OR gate circuit 217 via AND gate circuit 222, OR gate circuit 224 and AND gate circuit 225. First, since $A_1 = Q_1$, the inputs to the exclusive OR gate circuit 217 are all "0" except $Q_1$; the exclusive OR gate circuit 217 produces an output $Q_1$. The output is produced from the output line 237 as $A_1$.

Figure 9:
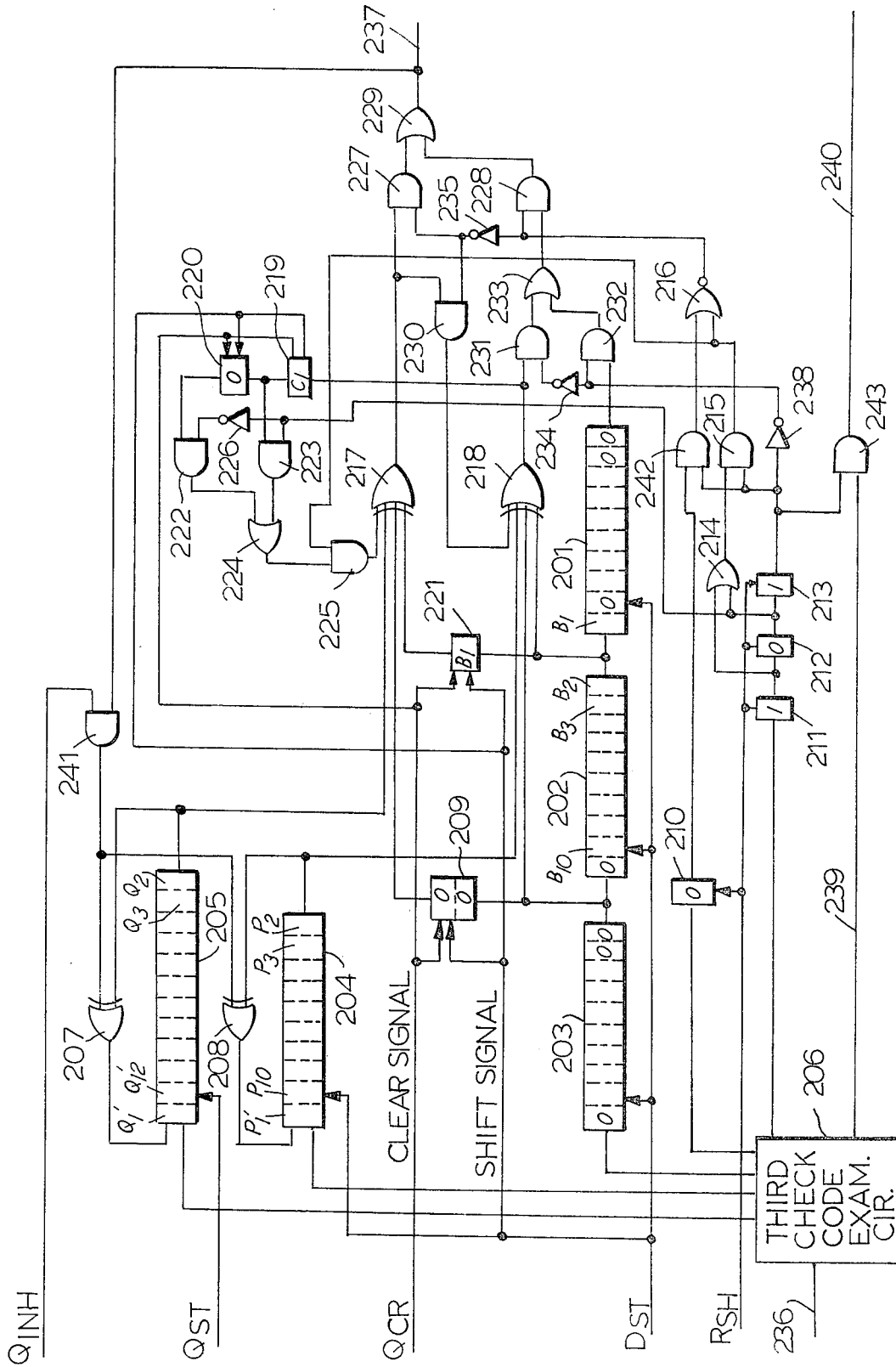

On the other hand, since $C_1 = P_1 \oplus A_1 \oplus B_1$, the exclusive OR gate circuit 218 restores $C_1$ which is fed to a shift register 219. FIG. 9 shows the state after the data has been shifted by 1 bit.

Then, $A_2 = Q_2 \oplus B_1$, and the exclusive OR gate circuit 217 produces $A_2$ which is the result of a modulo 2 operation of $Q_2$ and outut $B_1$ of the shift register 221.

Figure 10:
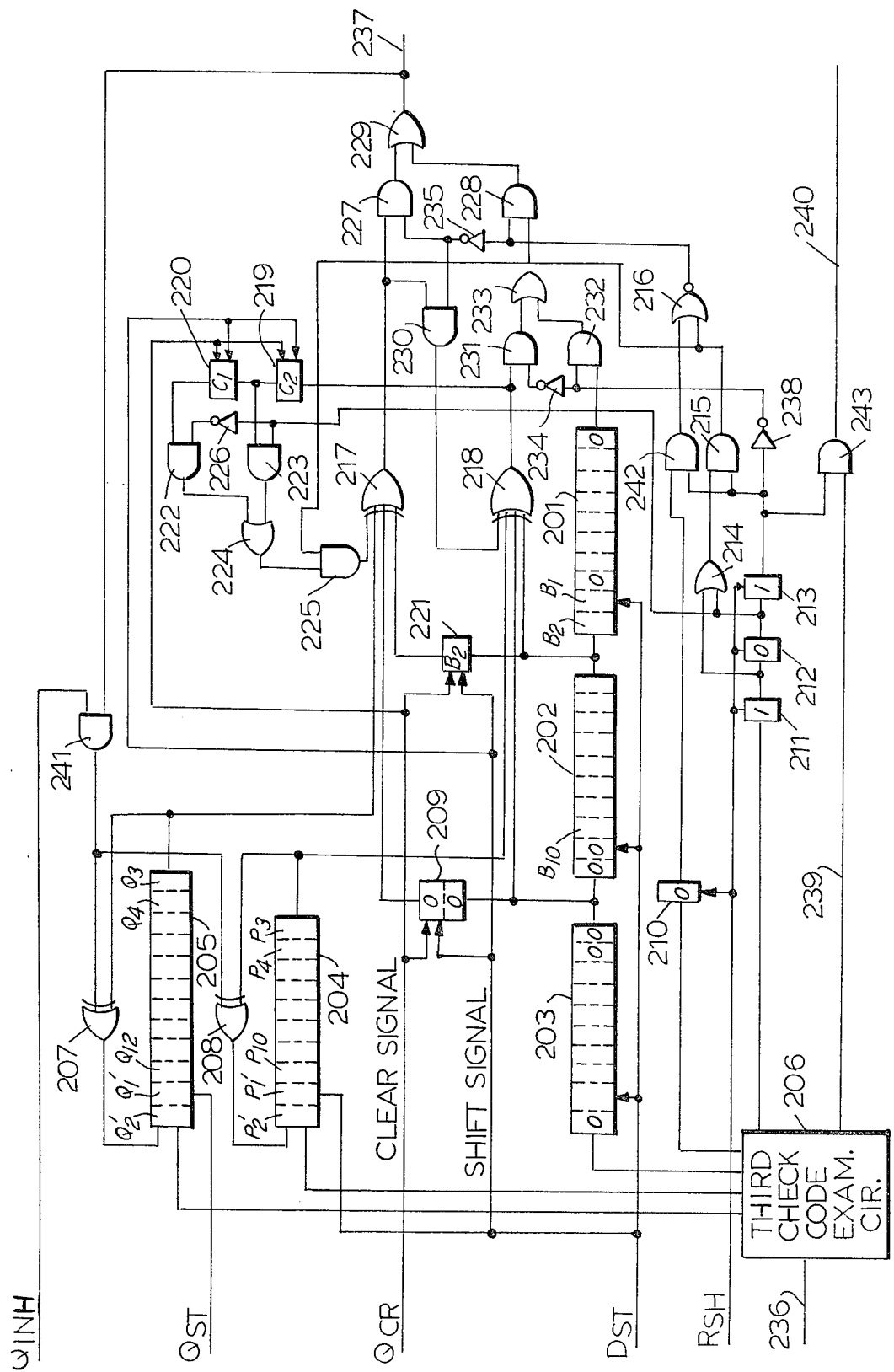
Figure 11:
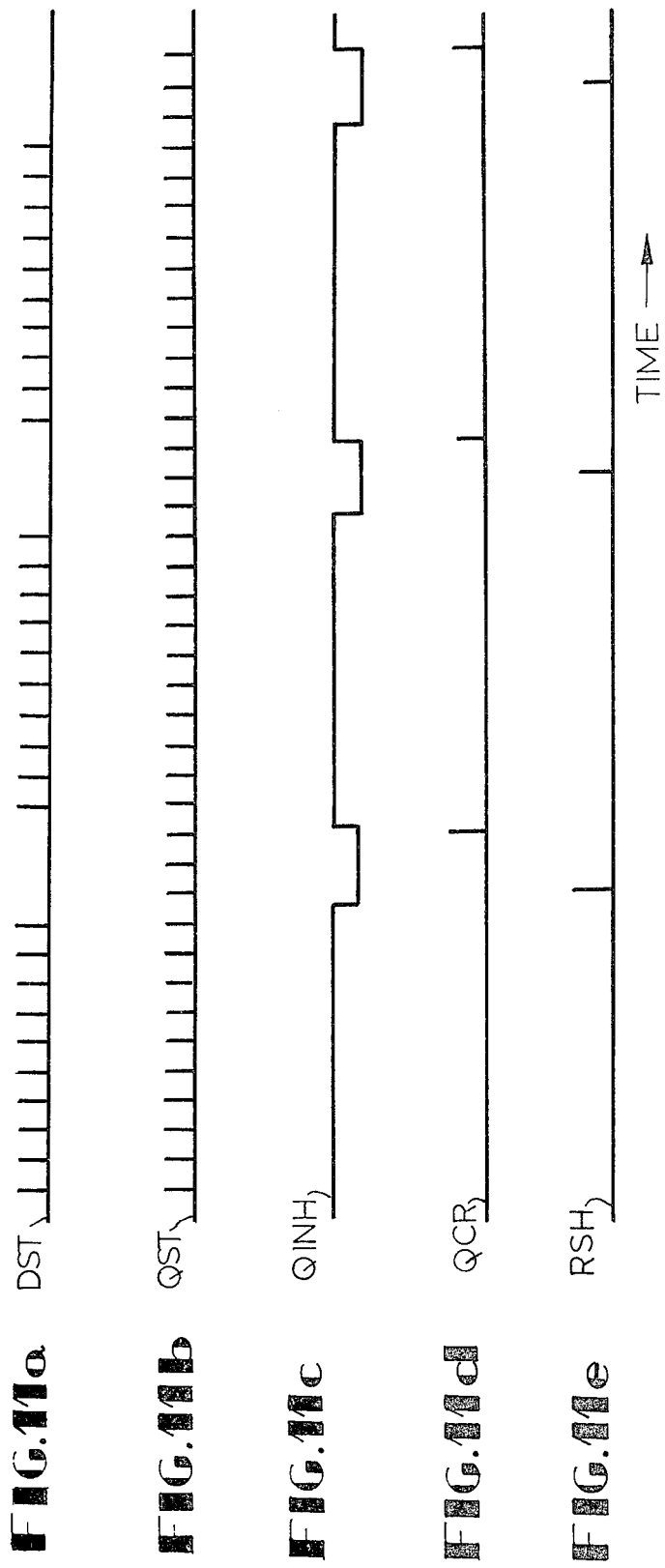
FIGS. 11a–11e are timing charts illustrating the signals at each of the portions of the decoder circuits.

On the other hand, since $C_2 = P_2 \oplus A_2 \oplus B_2$, the reproduced $C_2$ is fed to the shift register 219. FIG. 10 shows the contents of the registers after the data has been shifted by 2 bits. Since $A_3 = Q_3 \oplus B_2 \oplus C_1$, the exclusive OR gate circuit 217 obviously performs the above-noted operation to produce $A_3$. $C_3$ is also restored as mentioned earlier. The data A is successively regenerated and is produced. The restored data C is left nowhere. The data C, however, becomes a single error after the data A has been restored, and can be restored by the aforementioned process for correcting single error.

FIGS. 11a–11e comprise is a timing chart illustrating the signals at each portion of FIGS. 6 to 10.

Although the foregoing description has dealt with the case when the data A and C were erroneous, the data can be restored through the same process even when the data A and B or the data B and C are erroneous.

Furthermore, in the foregoing description, the erroneous data are all rendered to acquire the level "0" so that the erroneous patterns are in agreement with the data patterns. Usually, however, such a particular processing needs not be effected. Assume that the data A among the data A, B and C has erroneously turned into A'. In this case, the the received data are A', B and C. Furthermore, if the erroneous pattern is given by $e_A$, $$A' = A \oplus e_A$$

which is a single error. It is corrected by the code P, because $$A \oplus B \oplus C \oplus P = 0$$

whence, $$A' \oplus B \oplus C \oplus P = e_A \oplus A \oplus B \oplus C \oplus P = e_A$$

That is, the erroneous pattern can be obtained if all of the received data and code P are subjected to a modulo 2 operation.

On the other hand, from the relationship, $$A' = A \oplus e_A$$

there holds a relationship, $$A = A' \oplus e_A$$

whereby it is allowed to correct the data A. The same holds true even when the two data are erroneous.

Figure 12:
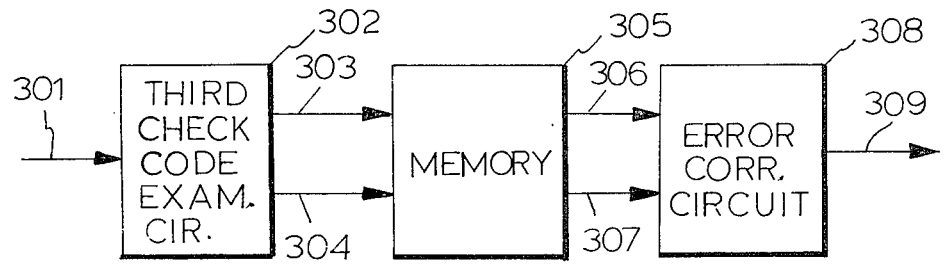
FIG. 12 is a block diagram illustrating an embodiment of the present invention.

FIG. 12 is a block diagram illustrating an embodiment of the present invention which is suited for decoding the signals illustrated in FIG. 4. In FIG. 12, a third check code examining circuit 302 which generates pointer signals examines the third check codes of the signals that are constructed as illustrated in FIG. 4 and which are introduced through an input line 301. The data are sent to a data output line 303, and pointer signals which are the examined results of the third check codes are sent to a pointer signal output line 304 and are fed to a memory 305. The pointer signals are added to all of the data forming the third check codes. Namely, the examined result of $R_1$ is added as a pointer signal to the data 1A, 2A, 3A. The memory 305 words to transform the time axis of the received data. In other words, a set of data, and first and second check codes that are scattering in the signal setup of FIG. 4 are rearranged to be close to each other in regard to time. For example, 1A, 1B, 1C, 1P and 1Q are produced as a set of data.

The data and first and second check codes of which the time axis is transformed have pointer signals which are the examination results of the third check codes, and the memory produces data to a data output line 306 and further produces pointer signals to a pointer output line 307.

An error correcting circuit 308 corrects the erroneous data indicated by pointer signals relying upon the pointer signals and the first and second check codes, and produces the corrected data onto an output line 309.

Figure 13:
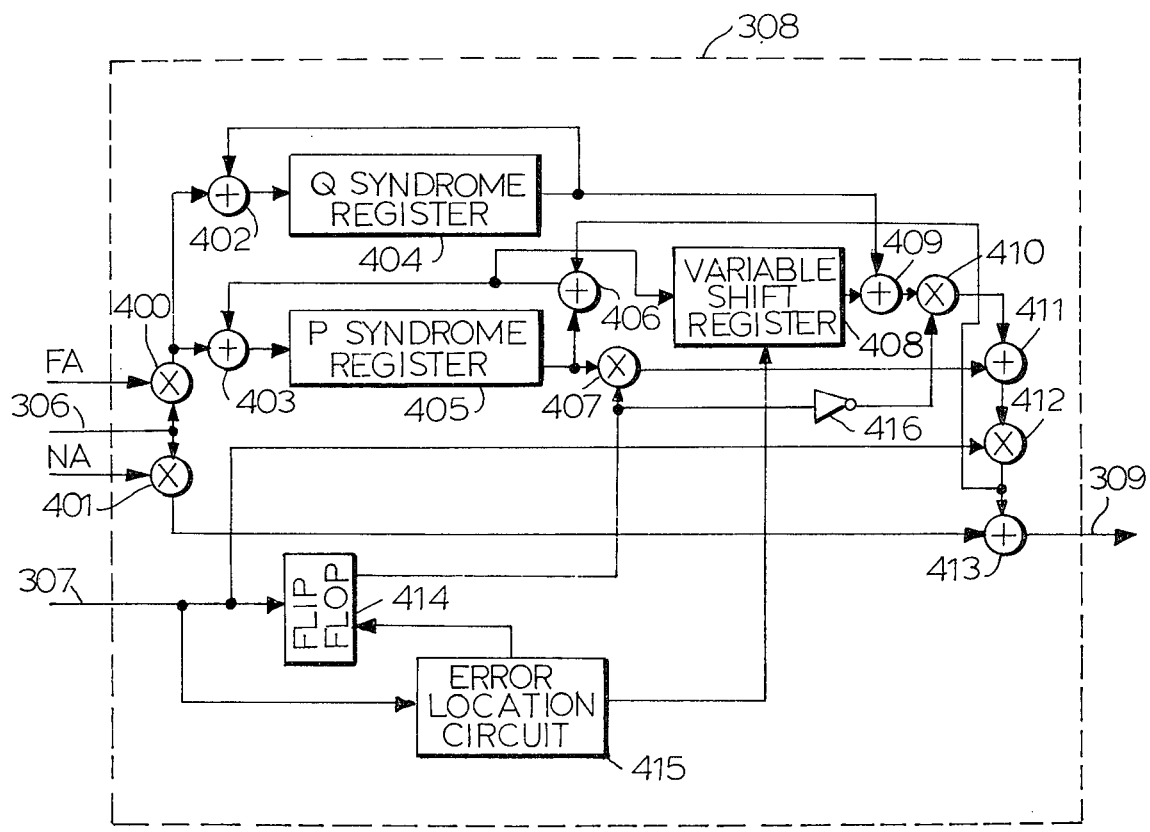
FIG. 13 is a diagram illustrating a setup of an error correcting circuit according to the embodiment of the present invention.

FIG. 13 illustrates a setup of the error correcting circuit 308. A Q syndrome register 404 and a P syndrome register 405 perform syndrome calculations, respectively, prior to correcting the data. Namely, the data produced by the memory onto the data output line 306 is corrected by the error correcting circuit 308 and is produced onto the output line 309. Here, the correction is effected with the abovementioned set as a unit, and the syndrome operation is effected before the data of the set is successively produced. This process is carried out as mentioned below. First, prior to producing the data of a new set, the data and the first and second check codes are once read out. At this moment, an AND gate circuit 400 is opened by a signal FA, and an AND gate circuit 401 is closed by a signal NA. Hence, the thus read signals are fed to modulo 2 adders 402 and 403 only. The modulo 2 adder 402 and the Q syndrome register 404 newly prepare Q codes from the received group of data in the same procedure as that of the sending side.

Here, the transmitted data are denoted by A, B, C, and Q codes attached thereto are denoted by Q, while the received data are denoted by A', B', C', and the formed Q codes are denoted by Q''. Therefore, the formed Q codes are denoted by Q''. Thereafter, each bit of the codes Q'' is successively subjected to the modulo 2 addition by Q' which stands for Q codes and by modulo 2 adder 402, to thereby form a Q syndrome $S_2$. Likewise, a P syndrome $S_1$ is also formed. If there is no error in the received data or in the first and second check codes, $S_1 = S_2 = 0$. If there is error in the received data, the P syndrome $S_1$ and Q syndrome $S_2$ do not become "0".

In this case, the pointer signals are produced onto the pointer signal output line 307 accompanying the respective data. When there are two errors, however, the difference between the locations is calculated by an error location circuit 415, and is fed to a variable shift register 408. Here, if the data A and C are erroneous, i.e., if, $$A' = A \oplus e_1$$

$$B' = B$$

$$C' = C \oplus e_2$$

$$P' = P$$

$$Q' = Q$$

the two erroneous data can be corrected by subjecting them to a modulo 2 operation together with the received data, provided error patterns $e_1$ and $e_2$ are calculated. The thus calculated syndrome contains the above-mentioned patterns $e_1$ and $e_2$.

According to the equations (1) and (2) mentioned earlier, the syndromes can be given by, $$S_{1(i)} = e_{1(i)} \oplus e_{2(i)} \quad (10)$$

$$S_{2(i)} = e_{1(i)} \oplus e_{2(i-2)} \quad (11)$$

wherein i represents a bit number.

The error patterns $e_1$ and $e_2$ can be separated by the same process as that of restoring the aforementioned data. The AND gate circuit 400 is closed by the FA signals which help calculate the syndromes $S_1$ and $S_2$, and instead, the AND gate circuit 401 is opened by the NA signal after the syndromes $S_1$ and $S_2$ are calculated.

By this time, it is ready to effect the correction. Then, the data of the set are successively read from the memory 308. Pointer signals accompanying the data are of course read out. At this time, when the data are indicated to be erroneous by the pointer signals, the AND gate circuit 412 is opened. When the two data are erroneous, a pointer flip-flop circuit 414 produces an output "1" after the first erroneous data has been produced from the output line 309 to indicate that the next pointer signal is a second one. The variable shift register 408 varies the length of shifting depending upon the difference of error locations. For example, when the errors hava a neighboring relationship, the variable shift register 408 works to delay the data by 1 bit, and when errors are contained in the data A and C as mentioned earlier, the variable shift register 408 words to delay the data by 2 bits.

First, when the signal A is produced on the output line 309 of the memory 308, as this the data is erroneous, the pointer signal output line acquires the level "1" and causes the AND gate circuit 412 to open. Furthermore, since the data of this set contains two errors, the pointer flip-flop produces the output "0". Consequently, the AND gate circuit 407 remains closed, and the AND gate circuit 410 is opened by the NOT circuit 416. The variable shift register 408 has been so set as to delay the data by 2 bits. Since the first two bits produced by the variable shift register 408 are "0", the outputs of the Q syndrome register 404 are successively subjected to the modulo 2 addition by a modulo 2 adder 413 together with the data A through modulo 2 adder 409, AND gate circuit 410, modulo 2 adder 411 and AND gate circuit 412, to thereby correct two bits.

On the other hand, the output of the AND gate circuit 412 is fed to the modulo 2 adder 406, subjected to the modulo 2 operation together with the syndrome $S_1$ which is the content of the P syndrome register, and is fed back thereto. Therefore, the P syndrome register successively receives the error pattern $e_2$ only. As the two bits are produced, the variable shift register 408 produces an output of syndrome $e_2$ which is subjected to the modulo 2 addition together with $S_2$ by the modulo 2 adder 409. It will be easily understood that the output is a third or a subsequent bit of the error pattern $e_1$. Thus, the data A is successively corrected and is produced through the output line 309. After the data A has been produced, the pointer flip-flop circuit 414 is set to acquire the level "1", and indicates that a pointer signal appearing next is the second one in the set. Therefore, the AND gate circuit 407 is opened, and the AND gate circuit 410 is closed. Furthermore, the content of the P syndrome register 405 contains the modulo-2-added results of syndrome $S_1$ and error pattern $e_1$, i.e., contains the error pattern $e_2$. The content of the Q syndrome register 404 does not change but circulates once to return to the initial position. Here, however, the data content is shifted by an extra amount of 1 bit. This is the same as that of the Q register mentioned in the foregoing embodiment.

Then, the data B appears on the memory output line. However, since this data is not erroneous, the pointer signals acquire the level "0"; the AND gate circuit 412 is closed and the data B is allowed to be produced from the output line 309.

In this case, the contents of the P syndrome register 405 and the Q syndrome register 404 are circulated once and produce no change. However, the Q syndrome register 404 is advanced by 1 bit as mentioned earlier.

Next, as the data C are produced on the data output line 306, the pointer signals acquire the level "1" to open the AND gate circuit 412. In this case, the AND gate circuit 410 remains closed and the AND gate circuit 407 remains open, so that the error pattern $e_2$ which is the content of the P syndrome register 405 is successively produced from the AND gate circuit 412, and the data C is corrected by the modulo 2 adder 413. Consequently, the corrected data C is produced from the output line 309. The correction of a set of data is thus completed. Therefore, the operation returns to the state of initial syndrome calculation to initiate the correcting operation for the next set of data.

Single error or any other errors can be corrected as mentioned in the foregoing.

In the foregoing description, the third check codes are examined to generate pointer signals. The pointer signals, however, can be generated by any other means as mentioned earlier. In this case, means for examining the third check codes may be replaced by any other pointer signal generating means. Such means have heretofore been employed in the field of computers, and they are not mentioned in detail herein.

As mentioned above, the error correcting device of the present invention exhibits such a very high error correcting ability such that any two erroneous words can be corrected based upon a simply constructed circuit setup.

When the error correcting device of the present invention is used for PCM-type tape recorders or the like, it is of course necessary to provide means for dealing with synchronizing signals.

What is claimed is:

1. An error correcting device used for an apparatus for correcting errors in a plurality of data units which each consist of a plurality of bits constituting a set, wherein said apparatus receives said plurality of data and comprises: a first check code generator for generating a first check code by means of a modulo 2 operation of corresponding bits of a set of data, and a second check code generator for generating a second check code by means of a modulo 2 operation of corresponding bits of successively circulated or shifted results of said set of data, wherein said error correcting device, said set of data, said first check code and said second check code are fed to said error correcting device, and wherein said error correcting device comprises:

a pointer generating means for receiving said set of data, said first check code and said second check code and for generating a pointer signal that indicates erroneous data or check codes in said set of data being received;

an error signal generating means, coupled to said pointer generating means, for generating an error signal that indicates erroneous bits of said erroneous data; and a data correcting means, coupled to said pointer generating means and to said error signal generating means, for correcting said erroneous data by means of said error signal.

2. An error correcting device according to claim 1, further comprising a third check code generator for generating a third check code which is used together with said first and second check codes for detecting erroneous data, wherein said pointer signal generating means generates said pointer signal from said third check code in combination with said data, said first check code and said second check code.

3. An error correcting device according to claim 1, further comprising a memory means for rearranging said set of data, said first check code and said second check code in the order of their original transmission as input signals when said data and said first check code and said second check code are arrayed at separate positions on a time axis of said original transmission signals being transmitted.

4. An error correcting device according to claim 3, further comprising a third check code generator for generating a third check code which is used together with said first and second check codes for detecting erroneous data, wherein said pointer signal generating means generates said pointer signal from said third check code in combination with said data, said first check code and said second check code and said memory means rearranges said pointer signal in the order of said original signals together with said data, said first check code, and said second check code.

5. An error correcting device according to claim 4, further comprising means for adding said third check code to a block consisting of a plurality of adjacently located data, said first check code and said second check code, wherein said memory means commonly attaches said pointer signal to said block.

* * * * *